(12) United States Patent
Song et al.

(10) Patent No.: US 8,167,093 B2
(45) Date of Patent: May 1, 2012

(54) POWER RAMP FOR VEHICLE AND CONTROL METHOD THEREOF

(75) Inventors: Jung-Il Song, Chnagwon-si (KR); Jae-Cheol Moon, Chnagwan-si (KR)

(73) Assignees: Changwon National University, Changwon-si, Gyeongsangnam-do (KR); Industry Academy Cooperation Corps

( * ) Notice: Subject to any disclaimer, the term of this patent is extended or adjusted under 35 U.S.C. 154(b) by 434 days.

(21) Appl. No.: 12/512,807

(22) Filed: Jul. 30, 2009

(65) Prior Publication Data

US 2010/0332085 A1 Dec. 30, 2010

(30) Foreign Application Priority Data

Jun. 30, 2009 (KR) .................. 10-2009-0058700

(51) Int. Cl.
*B66F 7/00* (2006.01)
(52) U.S. Cl. .................. 187/209; 187/239; 414/539
(58) Field of Classification Search .................. 187/209, 187/239; 414/539
See application file for complete search history.

(56) References Cited

U.S. PATENT DOCUMENTS

| | | | | |
|---|---|---|---|---|
| 5,261,779 A | * | 11/1993 | Goodrich ............ | 414/546 |
| 7,765,671 B2 | * | 8/2010 | Ablabutyan et al. ......... | 29/464 |
| 2004/0035343 A1 | * | 2/2004 | Floe et al. ............ | 114/51 |
| 2009/0255765 A1 | * | 10/2009 | Mishima ................ | 187/293 |
| 2009/0278395 A1 | * | 11/2009 | Pollard et al. .......... | 297/85 M |
| 2010/0028115 A1 | * | 2/2010 | Ablabutyan et al. ........ | 414/539 |
| 2010/0104392 A1 | * | 4/2010 | Bowen et al. .......... | 410/26 |
| 2011/0088980 A1 | * | 4/2011 | Husmann ............... | 187/249 |

\* cited by examiner

*Primary Examiner* — Hussein A. Elchanti
(74) *Attorney, Agent, or Firm* — Sherr & Vaughn, PLLC

(57) ABSTRACT

A power ramp for a vehicle and a control method thereof are disclosed. A power ramp for a vehicle includes a main frame defining an exterior appearance thereof, a base plate provided in a bottom of the main frame to define a base of the main frame, a main ramp provided on the base plate, a ramp holder having an end hingedly coupled to the main ramp to support the main ramp, at least one sliding part provided in right and left end portions of the main frame to guide forward-and-rearward motion of the ramp holder, a pair of power generating device provided in the ramp holder to supply power required for the forward-and-rearward motion of the main ramp, a pair of sliding chains longitudinally provided along the right and left end portions of the main ramp, the pair of the sliding chains supporting the main ramp to be movable forward and rearward, and a manual operation changing part provided in the main frame, the manual operation changing part selectively controlling rotation of the sliding chains to enable the main ramp to be movable manually.

2 Claims, 6 Drawing Sheets

POWER RAMP FOR VEHICLE AND CONTROL METHOD THEREOF

CROSS REFERENCE TO RELATED APPLICATION

This application claims the benefit of the Patent Korean Application No. 10-2009-0058700, filed on Jun. 30, 2009, which is hereby incorporated by reference as if fully set forth herein.

BACKGROUND OF THE DISCLOSURE

1. Field of the Disclosure

The present invention relates to a power ramp for a vehicle and a control method thereof. More particularly, the present invention relates to a power ramp having a main ramp movable more efficiently by both of a pair of chains and a motor assembly, which is manual-operable and overload determinable to enhance safety and durability.

2. Discussion of the Related Art

In general, vehicles have to be higher than roads and it is difficult to introduce vehicles for disables such as wheelchairs movable along the roads into large vehicles such as buses.

To introduce such a wheelchair into such a bus smoothly, various ramps having predetermined oblique have been presented to compensate the height difference between the wheelchair and bus.

Also, to improve convenience for the old and feeble to get into or out of the bus, demands for ultra-low floor buses designed with the minimum ground clearance that is below 400 mm are increasing recently. Because of that, a sliding ramp extractable to the road from a bottom of the bus to allow a wheelchair to get into the bus is installed in such an ultra-low floor bus.

However, such the various ramps would have weak durability. If load is applied to a right or left portion of such the ramp intensively, not to an overall portion uniformly, there might be twist in a bottom of the ramp that causes sliding failure.

In addition, if the sliding of the ramp is not preformed by an obstacle, there might be damage to a motor or the ramp.

Furthermore, if the ramp is operated, with not identifying a state of the vehicle parking and a state of a door open or closed, there might be an accident that occurs because of vehicle movement or collision with the door.

SUMMARY OF THE DISCLOSURE

Accordingly, the present invention is directed to a power ramp for a vehicle.

An object of the present invention is to provide a power ramp for a vehicle, which includes a main ramp movable by a pair of motors and a pair of sliding chains.

Another object of the present invention is to provide a power ramp for a vehicle, which is manual-operable by simple operation in case it is difficult to automatically operate the main ramp.

A further object of the present invention is to provide a power ramp for a vehicle, which is able to operate the main ramp by sensing an operational state or overload of a vehicle such as bus to prevent accidents as well as damage to parts.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a power ramp for a vehicle includes a main frame defining an exterior appearance thereof; a base plate provided in a bottom of the main frame to define a base of the main frame; a main ramp provided on the base plate; a ramp holder having an end hingedly coupled to the main ramp to support the main ramp; at least one sliding part provided in right and left end portions of the main frame to guide forward-and-rearward motion of the ramp holder; a pair of power generating device provided in the ramp holder to supply power required for the forward-and-rearward motion of the main ramp; a pair of sliding chains longitudinally provided along the right and left end portions of the main ramp, the pair of the sliding chains supporting the main ramp to be movable forward and rearward; and a manual operation changing part provided in the main frame, the manual operation changing part selectively controlling rotation of the sliding chains to enable the main ramp to be movable manually.

The power generating device may include a motor assembly generating power; a motor gear integrally provided with the motor assembly, the motor gear rotated by the power of the motor assembly; a driving gear relative moving with respect to the rotation of the motor gear; and a driven gear integrally coupled to the driving gear to rotate together with the driving gear, the driven gear having a substantially smaller diameter than the driving gear.

the pair of the sliding chains may be wound around chain pulleys provided in front and rear ends of the base plate, respectively, and the pair of the sliding chains may be connectedly in communication with each other by connection chains passing the main frame in a right-and-left direction. Also, a tension measuring part and a tension adjusting part may be provided in the main ramp to measure the tension of the sliding chain and to adjust the tension of the sliding chain, respectively.

The connection chains are wound around a pair of connection pulleys provided in right and left ends of the main frame, respectively, and a pair of auxiliary pulleys provided on both sides of the connection pulleys, respectively, further wherein a tension adjusting part is provided in the pair of auxiliary pulleys to adjust the tension of the connection chains by adjusting the positions of the auxiliary pulleys.

The manual operation changing part may include a securing member selectively in contact with a pulley shaft supporting the chain pulley to stop the rotation of the pulley shaft; a securing guide guiding sliding motion of the securing member; and a pulling wire pulling the securing member to a predetermined direction, and the pulley shaft may be formed integrally with both of the chain pulley and the connection pulley to rotate together with both of them, the pulley shaft having a polygonal-column-shaped end, and the securing member may have a 'U' shaped section accommodating the polygonal-column-shaped end of the pulley shaft.

In another aspect of the present invention, a control method of a power ramp for a vehicle includes an installation command determining step determining whether an installation command is input by a button operating to extract a main ramp; a parking determining step determining whether a vehicle is parked if it is determined based on the result of the installation command determining step that the installation command is input; a door open determining step determining whether a door of the vehicle is open to extract the main ramp;

a ramp extracting step extracting the main ramp by operating a motor in a clockwise direction and alarming buzzer sound simultaneously, if it is determined that the installation is input and that the door is open simultaneously; a stop signal determining step determining whether a stop signal is input during the ramp extracting step; an overload determining step determining whether an input current is over a predetermined limit current only to apply overload to the motor during the ramp extracting step; a complete extraction determining step determining whether the main ramp is extracted completely by determining whether there is a limit signal; an extraction stopping step stopping the operation of the motor and stopping the alarming of the buzzer sound simultaneously, if it is determined that the main ramp is completely; a motor stopping step stopping the motor to stop the extraction of the main ramp, if it is determined based on the result of the overload determining step that the motor is overloaded; an overload settlement determining step continuously re-comparing the input current and the limit current, and determining whether the input current returns below the limit current, if the motor stopping step is started; and a time pass determining step determining whether the time taken for the input current to return below the limit current is over a predetermined time if it is determined based on the result of the overload settlement determining step that the input current returns below the limit current, and continuing the ramp extracting step if it is determined that the time taken for the input current to return below the limit current is over the predetermined time.

In a further aspect of the present invention, a control method of a power ramp for a vehicle includes a restitution command determining step determining whether a restitution command is input by a button operating to restitute an extracted main ramp; a ramp restituting step operating a motor in a counter-clockwise direction to restitute the main ramp into a vehicle and alarming buzzer sound simultaneously, if it is determined based on the result of the restituting command determining step that the restitution command is input; a stop signal determining step determining whether a stop signal is input during the ramp restituting step; an overload determining step determining whether an input current is over a predetermined limit current only to apply overload to the motor during the ramp restituting step; a complete restitution determining step determining the main ramp is restituted into the vehicle completely by determining whether there is a limit signal; a restitution stopping step stopping the operation of the motor and stopping the buzzer sound simultaneously if the main ramp is restituted completely; a motor stopping step stopping the motor to stop the restitution of the main ramp if it is determined based on the result of the overload determining step that the motor is overloaded; an overload settlement determining step continuously re-comparing the input current with the limit current and determining whether an input current returns below a limit current by, if the motor stopping step is started; a time pass determining step determining whether the time taken for the input current to returns below the limit current is over a predetermined time if it is determined based on the result of the overload settlement determining step that the input current returns below the limit current, and continuing the ramp restituting step if the time is over the predetermined time; and a usage counting step adding the number of use times if the restitution stopping step is started.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Figure 1:
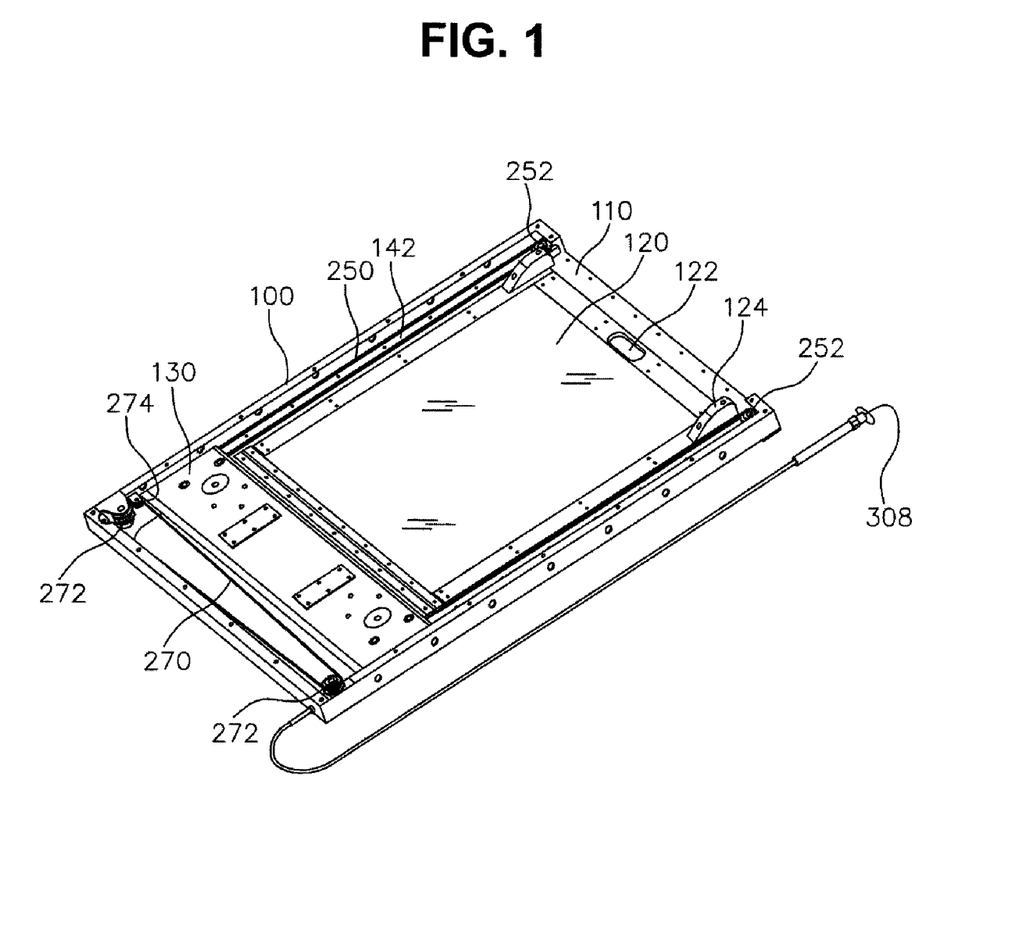
FIG. 1 is a perspective view illustrating a power ramp for a vehicle according to an exemplary embodiment of the present invention.
Figure 2:
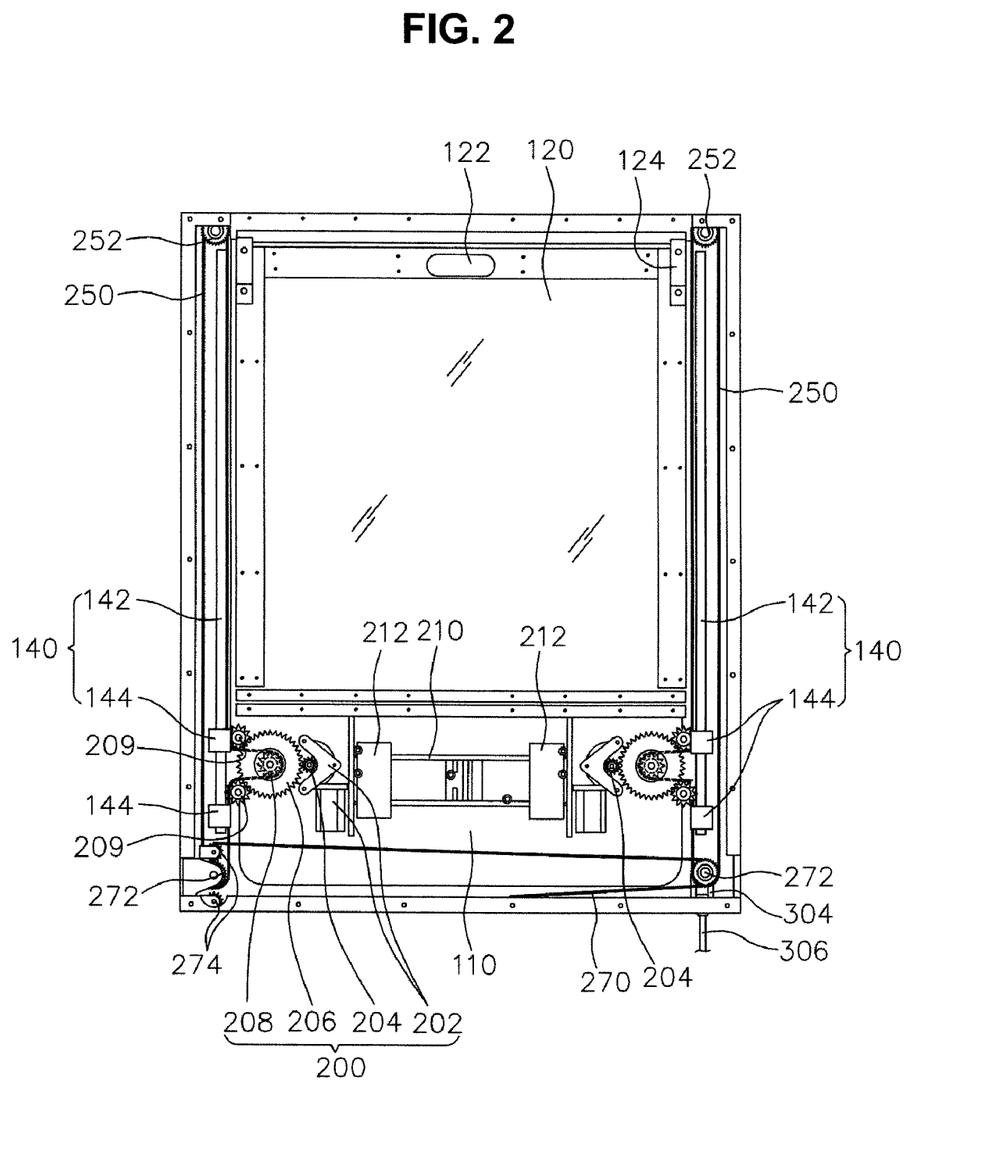
FIG. 2 is a plane view illustrating the ramp of FIG. 1 in a state of a ramp holder being taken off.
Figure 3:
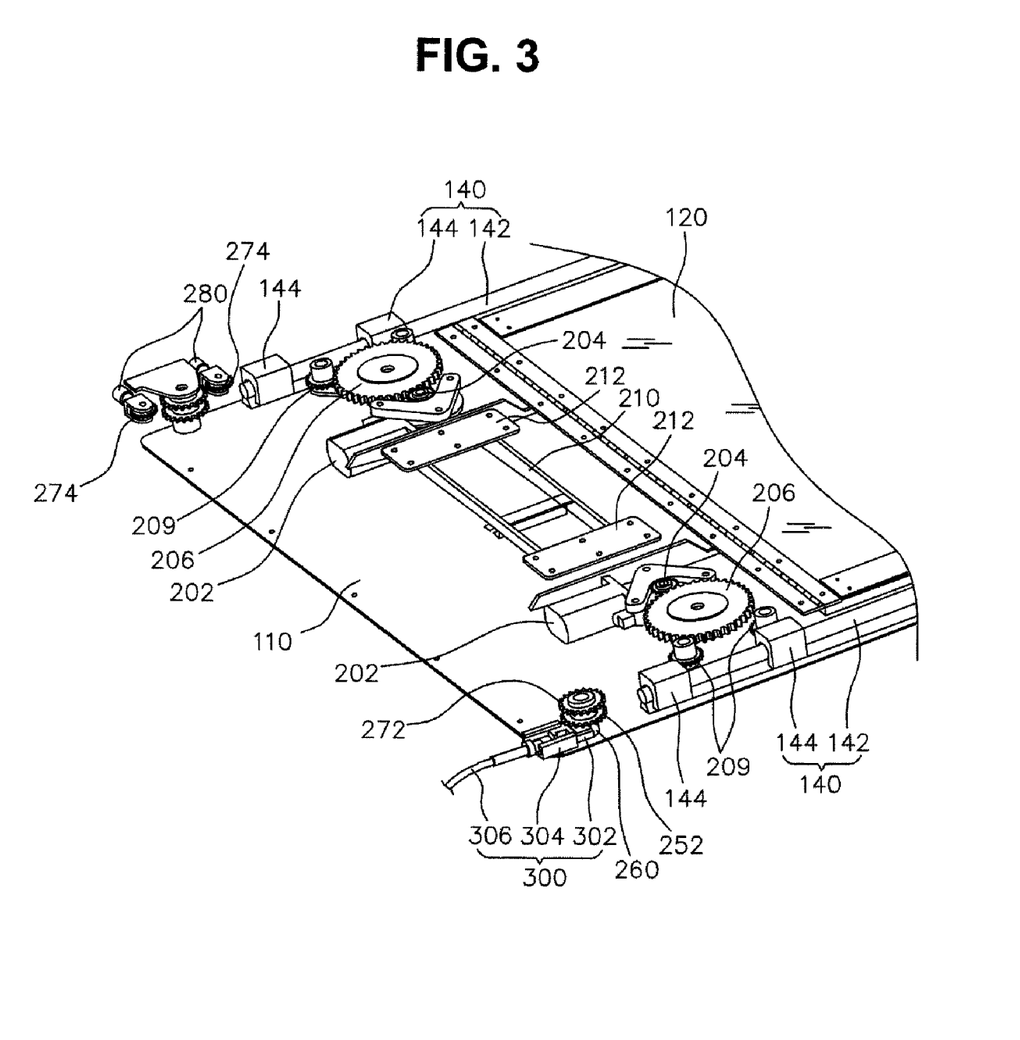
FIG. 3 is a perspective view partially illustrating a front portion of the ramp according to the embodiment.
Figure 4:
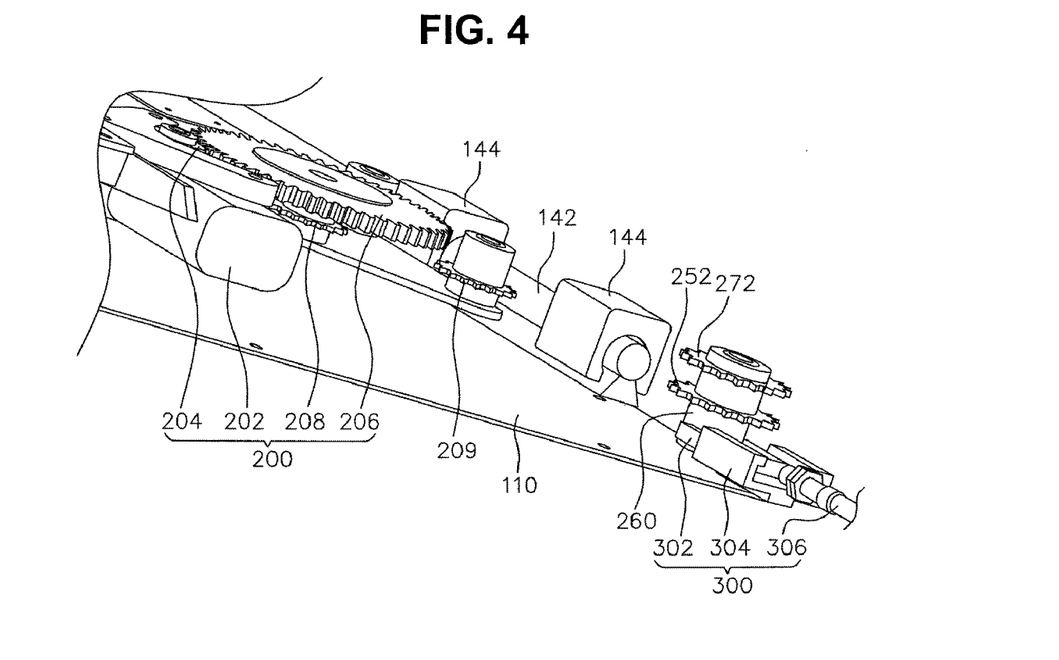
FIG. 4 is a perspective view illustrating a power generation part provided in the power ramp.

FIGS. 1 to 4 are diagrams illustrating a power ramp for a vehicle according to an exemplary embodiment of the present invention. That is, FIG. 1 is a perspective view illustrating a power ramp for a vehicle according to an exemplary embodiment of the present invention and FIG. 2 is a plane view illustrating the ramp of FIG. 1 in a state of a ramp holder being taken off. FIGS. 3 and 4 are enlarged perspective views illustrating components of the power ramp, respectively.

As shown in FIGS. 1 to 4, a power ramp for a vehicle according to an exemplary embodiment of the present invention includes a main frame 100, a base plate 110, a main ramp 120, a ramp holder 130, a sliding part 140, a pair of power generation parts 200, a pair of sliding chains 250 and a manual operation changing part 300. the main frame 100 forms frames of the power ramp and the base plate 110 is provided in a base of the main frame 100 to define an exterior appearance of the base of the power ramp. The main ramp 120 is provided on the base plate 110 and the ramp holder 130 has an end hingedly coupled to the main ramp 120 to support the main ramp 120. The sliding part 140 is provided in each of right and left ends of the main frame 100 to guide forward-and-rearward motion of the ramp holder 130. The pair of the power generation parts 200 may be provided in predetermined portions of the ramp holder 130 and they supply power for the forward-and-rearward motion of the main ramp 120, respectively. The pair of the sliding chains 250 may be provided along the right and left ends of the main frame 100. The manual operation changing part 300 selectively controls the rotation of the sliding chains to enable the main ramp 120 to move passively. As shown in the drawings, the main frame 100 is rectangular-shaped and the base plate 110 is provided in a bottom of the rectangular shaped main frame 100.

The base plate 110 is a rectangular plate having a predetermined thickness and it supports plural part installed thereon.

The main ramp 120 is a rectangular plate having a predetermined thickness and it is sliding movable on the base plate 110 in a forward and rearward direction.

A handle hole 122 is vertically formed through a rear end of the main ramp 120 to be employed as handle during the manual operation. A guide protrusion 124 is projected upward from each of right and left portions of the rear end to guide a cover (not shown) to open and close when the main ramp 120 is moving.

The ramp holder 130 is coupled to a front end of the main ramp 120 by a hinge and it supports the main ramp 120 to be sliding movable in a forward and rearward direction.

As shown in the drawings, the ramp holder 130 is configured of a plate crossing the main frame 100 in a right and left direction, with a predetermined length and width and it is coupled to a coupling plate 212 which will be described later and the sliding part 140.

The sliding part 140 includes a pair of guide rails 142 provided in both opposite ends of the main frame longitudinally and a guide block 144 sliding movable along each of the guide rail 142.

The guide rail 142 is configured of a circular cylinder and the guide block 144 is mounted to the guide rail 142 to be sliding movable.

The guide block 144, as shown in FIG. 2, is hexahedron-shaped and the ramp holder 130 is secured to an upper surface of the guide block 144.

The power generating device 200 is a device that generates power required for both of the main ramp 120 and the ramp holder 130 to be sliding movable. The pair of such the power generating devices 200 are provided under right and left end portions of the ramp holder 130, respectively.

As shown in FIGS. 2 and 4, the power generating device 200 includes a motor assembly 202 generating power, a motor gear 204 rotatable by the power of the motor assembly 202, a driving gear 206 relative-moving with respect to the rotation of the motor gear 204, and a driven gear 208 fixed to the driving gear 206 integrally to rotate together with the driving gear 206. A diameter of the driven gear 208 is substantially smaller than a diameter of the driving gear 206.

The motor assembly 202 generates the rotational force by using external power and such the rotational force of the motor assembly 202 is exposed outside by the motor heat 204. As the motor gear 204 rotates, the driving gear 206 coupled to the motor gear 204 rotates.

The driving gear 206 is a gear having a relatively larger size, that is, diameter than a size of the motor gear 204. The driven gear 208 smaller than the driving gear 206 is provided in the driving gear 206. The driving gear 206 and the driven gear 208 rotates about a single rotational shaft.

The sliding chain 250 is wound around the driven gear 208 and a pair of supporting gears 209 may be further provided and the pair of the supporting gears 209 is spaced apart a predetermined distance from the driven gear 208. The sliding chain 250 is wound around the driven gear 208 and the pair of the supporting gears 209.

The sliding chain 250 is installed in right and left ends of the base plate 110 longitudinally along main frame 100.

A chain pulley 252 is provided in each of front and rear ends of the base plate 110. That is, the chain pulleys 252 are installed in four corners of the rectangular-shaped base plate 110, respectively. The chain pulley 252 is a portion where the sliding chain 250 is hung.

The sliding chain 250 is hung on the chain pulley 252 formed in each of the front and rear ends of the base plate 110 and the driven gear 208 composing the power generating device 200.

Although not shown in the drawings, a tension measuring part measuring the tension of the sliding chain 250 and a tension adjusting part adjusting the tension of the sliding chain 250 may be further provided in a predetermined portion of the main frame 100.

Specifically, the tension measuring part (not shown) is provided in a center of each right and left side portions of the base plate 110 and it senses a state of the sliding chain 250 wound downward to measure the tension of the sliding chain 250. the tension adjusting part (not shown) is provided in a rear end of the main frame 100 and it moves the position of the chain pulley 252 according to the tension state of the sliding chain 250 to adjust the tension of the sliding chain 250.

The manual operation changing part 300 includes a pulley shaft 260 supporting the chain pulley 252, a securing member 302 selectively contacting with the pulley shaft 260 to stop the rotation of the pulley shaft 260, a securing guide 304 guiding the sliding motion of the securing member 302, and a pulling wire 306 pulling the securing member 302.

The pulley shaft 260 supports the rotation of the chain pulley 252. One of the pair of the pulley shafts 260 installed in a right portion of the front end of the base plate 110 is integrally formed with the chain pulley 252 and a connection pulley 272 and it rotates together with both of them. A lower portion of the other pulley shaft 260 installed in a right portion of the front end of the base plate 110 is configured of a polygonal column. That is, at least lower end portion of the pulley shaft 260 is polygonal-column shaped, such as a square or hexagonal column. As a result, if the polygonal column-shaped pulley shaft 260 is inserted in the securing member 302, the rotation of the pulley shaft 260 is stopped and the rotation of both the chain pulley 252 and the connection pulley 272 rotating integrally with the pulley shaft 260 is stopped.

The securing member 302 has a 'U' shaped-section to selectively accommodate the polygonal column shaped pulley shaft 260. That is, as shown in FIGS. 3 and 4, the securing member 302 is 'U' shaped, with an open rear surface and a front portion of the securing member 302 is coupled to the pulley shaft 260 to secure a lower end of the pulley shaft 260.

The securing guide 304 is formed to cover right and left portions of the securing member 302 and it supports the securing member 302 to be sliding movable forward and rearward.

The pulling wire 306 is pulled by a user and a handle 308 is provided in an end of the pulling wire 306. If the user pulls the handle 308, the securing member 302 moves forward along the securing guide 304 and thus the securing member 302 is separated from the pulley shaft 260.

The pair of the power generating devices 200 may be connected to each other. That is, as shown in FIG. 2, the pair of the power generating devices 200 are mounted under right and left end portions of the ramp holder 130 correspondingly. Such the right and left power generating devices 200 are connected to each other by a connection frame 210.

A coupling plate 212 is further provided in each of right and left ends of the connection frame 210. The coupling plate 212 is a plate with a predetermined size to be coupled to the ramp holder 130.

A connection chain 270 is installed to a front end of the main frame 100, crossing in a right-and-left direction. The pair of the sliding chains 250 are connected and communicated with each other by the connection chain 270.

Specifically, the connection pulley 272 is further provided beyond the chain pulley 252 installed in each of the right and left portions of the front end of the base plate 110. The connection chain 270 is wound around the connection pulley 272. Both of the chain pulley 252 and the connection pulley 272 installed in the right and left portions of the base plate 110 are rotated by a single shaft such that the pair of the sliding chains 250 may be in communication with the connection chain 270.

An auxiliary pulley 273 may be further provided adjacent to one of the connection pulleys 272 provided in the front left portion of the base plate 110. That is, a pair of auxiliary pulleys 274 may be provided in front and rear of the connection pulleys 272, with spaced apart a predetermined distance from the connection pulleys 272. As a result, the connection chain 270 rotates, with engaged to the pair of connection pulleys 272 and the pair of the auxiliary pulleys 272.

The tension adjusting part 280 is further provided in each of the pair of the auxiliary pulleys 274 and it adjusts the position of each auxiliary pulley 274 to adjust the tension of the connection chain 270. For example, a tension adjusting part 280 projected leftward from a left of the auxiliary pulley 274. The auxiliary pulleys 274 are movable rightward and leftward according to the rotation of the tension adjusting part 280 such that the tension of the connection chain 270 may be adjusted.

Although not shown in the drawings, a limit switch is installed to each of front and rear ends of the main frame 100 to sense the motion of the main ramp 120. That is, a restitution switch is installed to the front end of the main frame 100 to sense the restitution completion of the main ramp 120 and an extraction switch is installed in the rear end of the main ramp 120 to sense the extraction completion of the main ramp 120.

An operation and a control method of the power ramp having the above configuration mentioned above will be described as follows.

Figure 5:
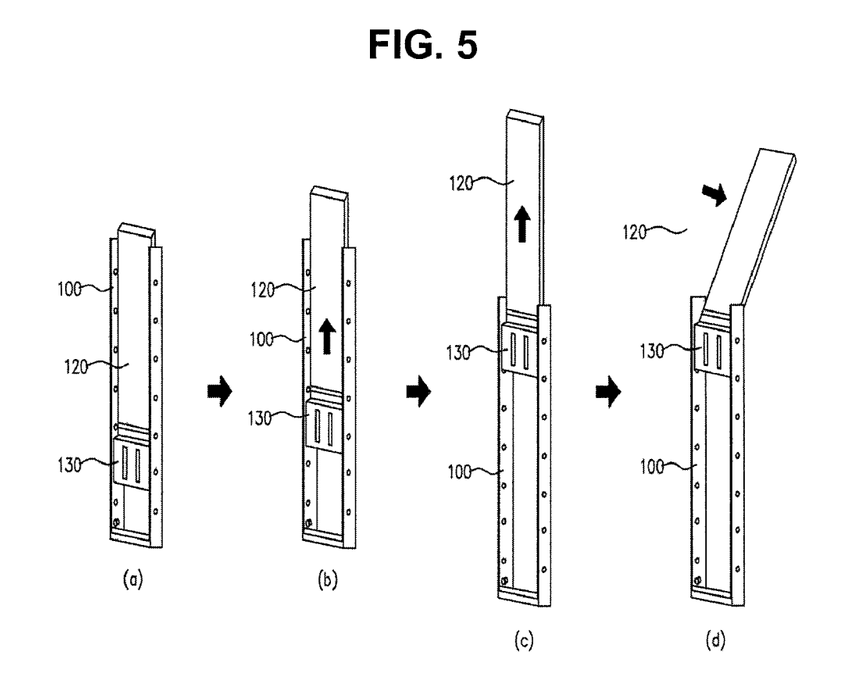
FIG. 5 is a diagram illustrating a main ramp provided in the power ramp that is extracted.

FIG. 5 illustrates an operational state of the power ramp for a vehicle having the above configuration.

First of all, the motor assembly 202 is operated by the power applied from the external power source, the motor gear 204 is rotates to rotates the driving gear 206. Hence, the driven gear 208 having the identical shaft is rotated together with the driving gear 206. Once the driven gear 208 is rotated, the driving gear 208 moves along the sliding chain 250.

Specifically, the manual operation changing part 300 is stopped during a normal operation. As a result, the securing member 302 covers the pulley shaft 260 (see, FIG. 4) and both the chain pulley 252 and the connection pulley 272 are stopped.

Since the chain pulley 252 is secured, the driven gear 208 is rotated and the driving gear 206 is rotated along the chain pulley 252. If the driving gear 208 is rotated to be movable, the power generating device 200 and the ramp holder 130 and the main ramp 120 which are connected to the driving gear 206 are moving forward and rearward simultaneously.

For example, in case that the motor assembly 202 is rotated in a clockwise direction, the main ramp 120 moves rearward as shown in FIG. 5 to separate from the main frame 100 gradually and it is finally be extracted out of the vehicle as shown in (d) of FIG. 5. At this time, the rear end of the main ramp 120 moves downward to the ground. That is, the front end of the main ramp 120 is coupled to the ramp holder 130 by the hinge. Because of that, if the main ramp 120 is out of the main frame 100, the main ramp 120 is rotated downward such that the rear end of the main ramp 120 may naturally contact with the ground, that is, the road.

In case of the state shown in (d) of FIG. 5, a vehicle such as a wheelchair can move into or out of the vehicle via the main ramp 120.

In case the main ramp 120 is restituted to its original position, the motor assembly 202 is rotated in a counter-clockwise direction and the main ramp 120 is restituted into the main frame 100 according to a reverse order as mentioned above.

In the meanwhile, in case there is malfunction, for example, an operation failure of the motor assembly 202, the main ramp 120 is stopped at an arbitrary position, it is changed into a manual operational mode such that the main ramp 120 may be extracted or restituted.

In the manual operation, the user pulls the handle 308 and then the securing member 302 is separated from the pulley shaft 260 from the state of FIG. 4 and the manual operation changing part 300 operates.

If the manual operation changing part 300 is operated, the chain pulley 252 and the connection pulley 272 are rotatable freely and thus the sliding chain 250 and the connection chain 270 wound around the chain pulley 252 and the connection pulley 272 are rotatable freely also. As the motor assembly 202 is stopped and the driven gear 208 would not be rotated in a state of being coupled to the sliding chain 250.

If the user moves the main ramp 120 in the state of pulling the handle hole 122, the sliding chain 250 is rotated to allow the motion of the main ramp 120 such that the main ramp 120 may be movable manually.

Figure 6:
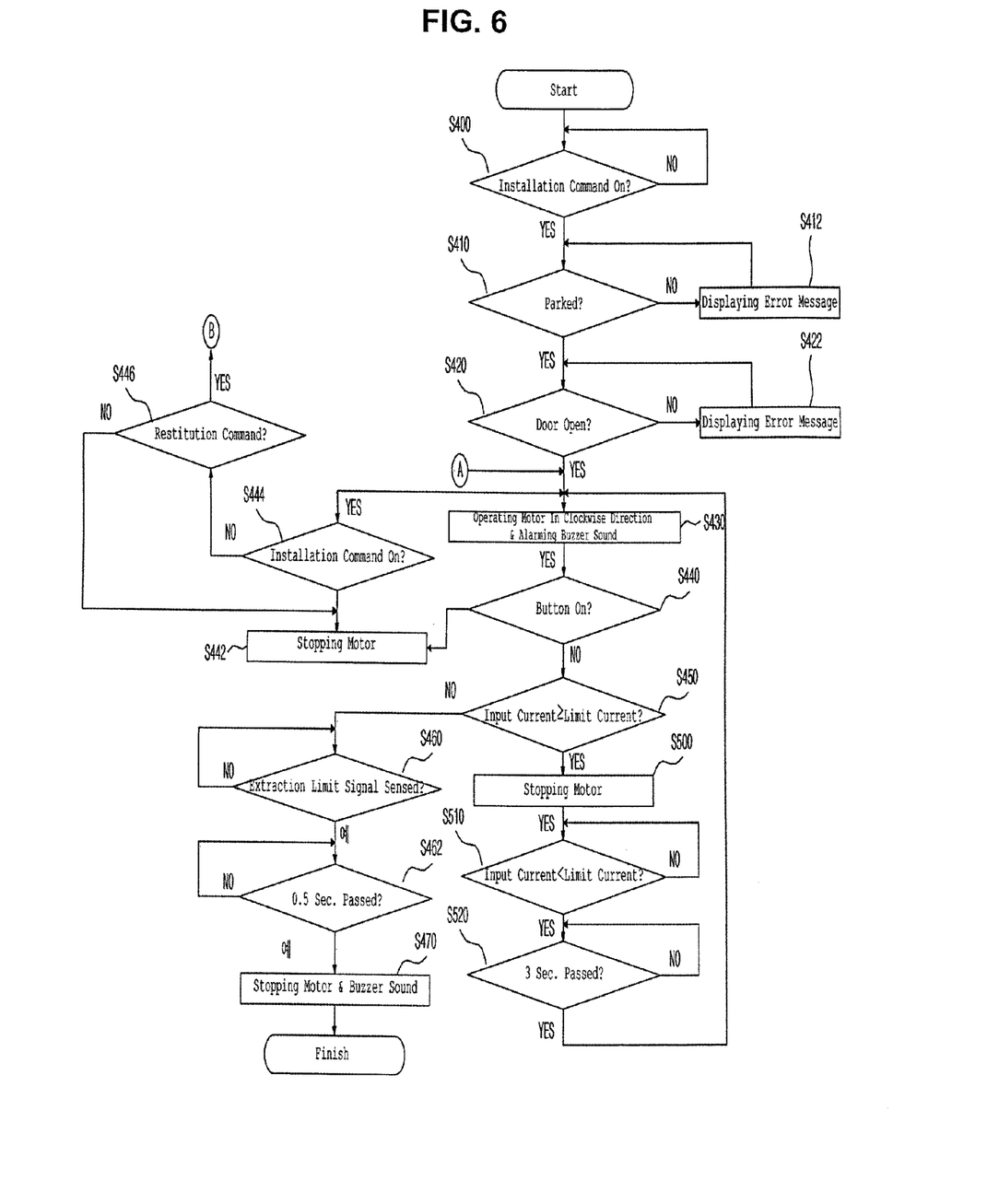
FIG. 6 is a flow chart illustrating a control method of the power ramp if the main ramp is extracted out of a vehicle.
Figure 7:
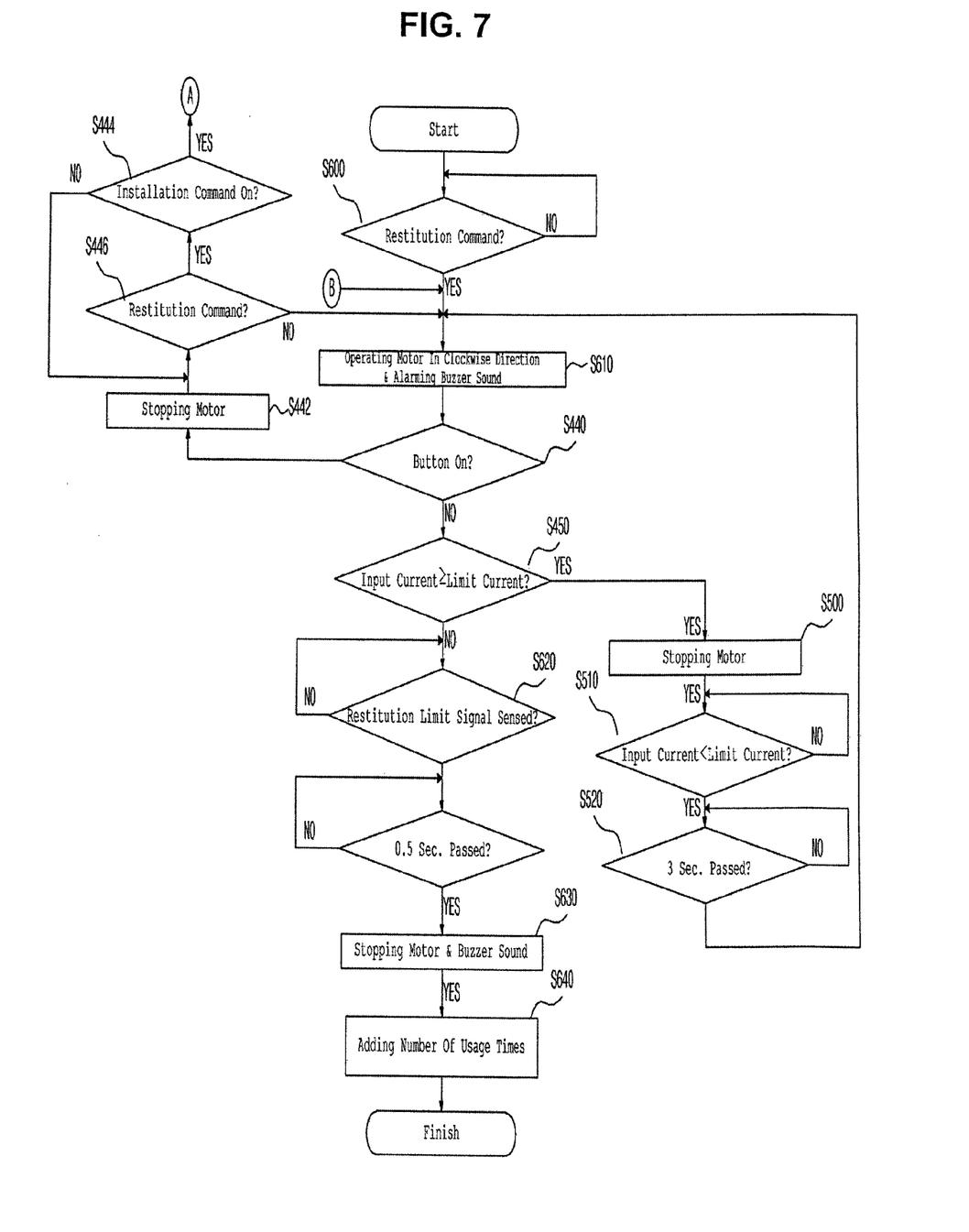
FIG. 7 is a flow chart illustrating a control method of the power ramp if the main ramp of FIG. 6 is restituted to its original position

FIGS. 6 and 7 illustrate flow charts of a control method of the power ramp according to the present invention. That is, FIG. 6 illustrates a control method of the power ramp in case the main ramp is extracted and FIG. 7 illustrates a control method of the power ramp in case the main ramp is restituted.

First of all, in reference to FIG. 6, a process of extracting the main ramp 120 according to the control method of the power ramp according to the present invention will be described.

Here, the control method includes a installation command determining step (S400), a parking determining step (S410), a door opening determining step (S420), a ramp extracting step (S430), a stop signal determining step (S440), an overload determining step (S450), a complete extraction determining step (S460), an extraction stopping step (S470), a motor stopping step (S500), an overload settlement determining step (S510) and a time pass determining step (S520) and a usage counting step (S640). The installation command determining step (S400) determines whether an installation command is input and the parking determining step (S410) determines whether the vehicle is parked if it is determined that the installation command is input. The door open determining step (S420) determines to extract the main ramp 120 whether a door of the vehicle is open. The ramp extracting step (S430) operates the motor in a clockwise direction to extract the main ramp 120 and sounds a buzzer simultaneously. The stop signal determining step (S440) determines whether a stop signal is input. The overload determining step (S450) determines whether overload is applied to the motor by input electric currents over a limit current. The complete extraction determining step (S460) determines whether the extraction of the main ramp 120 is complete. The extraction stopping step (S470) stops the operation of the motor and finishes the sound of buzzer simultaneously. The motor stopping step (S500) stops the motor to stop the extraction of the main ramp 120 if it is determined that there is overload on the motor. The overload settlement determining step (S510) determines whether the input electric current returns below the limit electric current. The time pass determining step (S520) determines whether the time taken for the input electric current returns below the limit electric current is passes a predetermined value.

More specifically, the installation command determining step (S400) determines whether the installation command is input by a button for extracting the main ramp 120. That is, it is determined whether the user pushes the button to command the main ramp 120 to be extracted.

The parking determining step (S410) determines whether the vehicle is parked if it is determined based on the result of the installation command determining step (S400) that the installation command is input. That is, in case the main ramp 120 is extracted while the vehicle is moving, there is concern of accidents and equipment damage.

The door open determining step (S420) determines whether any door of the vehicle is open if it is determined based on the result of the installation command determining step (S400) that the installation command is input. That is, in case the main ramp 120 is extracted with the door of the vehicle being closed, parts composing the main ramp 120 would be damaged by collision with the door and this step (S420) is to sense such the damage in advance.

If it is determined based on the result of the parking determining step (S410) or the door open determining step (S420) that the vehicle is not parked or the door is closed, an error message is displayed outside (error displaying step S411 and S422).

The ramp extracting step (S430) operates the motor in a clockwise direction to extract the main ramp 120 if it is determined that the installation command is input and that the vehicle is parked with the door being open. Here, the buzz sound is alarmed to call people's attention.

The stop signal determining step (S440) determines whether the button is pushed by the user during the ramp extracting step (S430). Here, if the button is pushed only to input a stop signal, a control part (not shown) stops the operation of the motor assembly (S442).

Hence, it is determined whether the installation command is re-input (S444) and whether a restitution command is input (S446). If it is determined that the installation command is input, the ramp extracting step (S430) re-starts. If it is determined that the restitution command is input, a ramp restituting step (S610) which will be described later starts.

While the ramp extracting step (S430) is performed, the overload determining step (S450) is performed to determine whether the input electric current is over the limit electric current only to apply overload to the motor. The overload determining step (S450) stops the operation of the motor assembly 202 to prevent damage to parts such as the motor assembly 202, if the extraction of the main ramp 120 is nor performed normally because of obstacle and the other abnormalities.

Such the overload determining step (S450) measures the current magnitude of the power supplied to the motor assembly 202 and it determines whether the input current is over the predetermined limit current. Here, the limit electric current may be preset variably according to the kind of the motor assembly 202. That is, if it is difficult for the used motor assembly 202 to function normally in case the electric current is over a predetermined current, the current is set as limit current, for example, 10 A and the like.

If the complete extraction determining step (S460) is performed if it is determined based on the result of the overload determining step (S450) that the input current is below the limit current. At this time, it is determined whether there is a limit signal. That is, the complete extraction step (S460) determines whether a complete extraction signal is sensed by the extraction switch.

If it is determined based on the complete extraction determining step (S460) that the extraction of the main ramp 120 is complete, a delay step (S462) is performed and the delay step (S462) operating the motor assembly 202 continuously approximately for 0.5 second.

The delaying step (452) considers that the moment for the extraction switch to sense the complete extraction is performed approximately prior to 2 mm to the actual position of the complete extraction.

The extraction stopping step (S470) stops the operation of the motor and stops the buzzer sound simultaneously, if the main ramp 120 is completely extracted.

The motor stopping step (S500) stops the operation of the motor assembly 202 if it is determined based on the result of the overload determining step (S450) that the motor is overloaded.

The overload settlement determining step (510) continuously re-compares the input current with the limit current to determine whether the input current returns below the limit current if the motor stopping step is started.

The time pass determining step (S520) determines whether the time taken for the input current to return below the limit current is over a predetermined time, if it is determined based on the result of the overload settlement determining step (S510) that the input current returns below the limit current. Hence, it is determined that the time is over the predetermined value, the time pass determining step (S520) continues the ramp extracting step (S430).

Here, the predetermined time is preset by the user and such the predetermined time should not overload the overall installation, for example, 3 seconds. Without overload to the installation or any problems caused by instant operation, this step may be omitted or the predetermined time may be shortened.

If it is determined based on the result of the time pass determining step (S520) that the time is over the predetermined time, the ramp extracting step (S430) is continued.

Next, in reference to FIG. 7, a process of restituting the extracted main ramp into the vehicle according to the control method of the present invention will be described as follows. Here, identical numeral references are used in identical steps to the steps of the process of extracting the main ramp 120 and the detailed description of the identical steps will be omitted accordingly.

This control method includes a restitution command determining step (S600), a ramp restituting step (S610), a stop signal determining step (S440), an overload determining step (S450), a complete restitution determining step (S620) a restitution stopping step (S630), a motor stopping step (S500), an overload settlement determining step (S510), a time pass determining step (S520) and a usage counting step (S640).

The restitution command determining step (600) determines whether a restitution command is input by a button operating to restitute an extracted main ramp. The ramp restituting step (S610) operates the motor in a counter-clockwise direction to restitute the main ramp into a vehicle and alarms buzzer sound simultaneously, if it is determined based on the result of the restituting command determining step (S600) that the restitution command is input. The stop signal determining step (S440) determines whether a stop signal is input during the ramp restituting step (S610). The overload determining step (S450) determines whether an input current is over a predetermined limit current only to apply overload to the motor during the ramp restituting step (S610) The complete restitution determining step (S620) determines the main ramp is restituted into the vehicle completely. The restitution stopping step (S630) stops the operation of the motor and stopping the buzzer sound simultaneously if the main ramp is restituted completely. The motor stopping step (S500) stops the motor to stop the restitution of the main ramp if it is determined based on the result of the overload determining step that the motor is overloaded. The overload settlement determining step (S510) continuously re-compares the input current with the limit current and determines whether an input current returns below a limit current by, if the motor stopping step is started. The time pass determining step (S520) determines whether the time taken for the input current to returns below the limit current is over a predetermined time if it is determined based on the result of the overload settlement determining step that the input current returns below the limit current, and continuing the ramp restituting step if the time is over the predetermined time. The usage counting step (S640) adds the number of use times if the restitution stopping step is started.

Specifically, the restitution command determining step (S600) determines whether a restitution command is input by the user's pushing a button.

The ramp restituting step (S610) operates the motor in a counter-clockwise direction to restitute the main ramp 120 into the vehicle, if it is determined based on the result of the restitution command determining step (S600). At this time, buzzer sound is alarmed simultaneously.

The stop signal determining step (S440) determines whether a stop signal is input during the ramp restituting step (S610), that is, whether the stop signal is input by the user pushing the button.

The overload determining step (S540) determines whether the motor is overloaded because an input current is over a limit current during the ramp restituting step (S610).

The complete restitution determining step (S620) determines whether the main ramp 120 is restituted into the vehicle by determining whether there is a limit signal, that is, whether a restitution completion signal is sensed by a restitution switch.

If it is determined based on the result of the complete restitution determining step (S620) that the main ramp is restituted completely, a delay step (S462) starts and the delay step (S464) continuously operates the motor assembly approximately for 0.5 second. The reason why such the step is performed is mentioned above.

The restitution stopping step (S630) stops the operation of the motor and the buzzer alarm simultaneously, if the main ramp 120 is completely restituted into the vehicle.

The motor stopping step (S500) stops the motor to stop the restitution process of the main ramp 120, if it is determined based on the result of the overload determining step (S450) that the motor is overloaded.

The overload settlement determining step (S510) continuously re-compares the input current with the limit current and it determines whether the input current returns below the limit current.

If it is determined based on the result of the overload settlement determining step (S510) that the input current is below the limit current, the time pass determining step (S520) determines whether the time taken for the overload settlement determining step to be performed is over the predetermined time value. If the time is over the predetermined value, the time pass determining step (S520) continues the ramp restituting step (S610).

The usage counting step (S640) adds the number of use times if the restitution stopping step (S630) is performed. That is, this step (S640) counts how many times the user uses the power ramp and such the counted number may be displayed outside.

If the button is pushed and the stop signal is input during the stop signal determining step (S440), the control part (not shown) stops the operation of the motor assembly (S202).

Hence, it is determined whether the restitution command is input or the installation command is input (S444). If it is determined that the restitution command is input, the ramp restituting step (S610) re-starts. If it is determined that the installation command is input, the ramp extracting step (S430) starts.

Although not shown in FIGS. 6 and 7, there may be further provided a step sensing whether the manual operation changing step (S300) is put into operation and shutting off the power supplied to the motor assembly 202 if it is determined that the manual operation changing step (S300) is put into operation.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A control method for a power ramp for a vehicle comprising;
   an installation command determining step determining whether an installation command is input by a button operating to extract a main ramp;
   a parking determining step determining whether a vehicle is parked if it is determined based on the result of the installation command determining step that the installation command is input;
   a door open determining step determining whether a door of the vehicle is open to extract the main ramp;
   a ramp extracting step extracting the main ramp by operating a motor and an alarming buzzer sound simultaneously, if it is determined that the installation command is input and that the door is open simultaneously;
   a stop signal determining step determining whether a stop signal is input during the ramp extracting step;
   an overload determining step determining whether an input current is over a predetermined limit current, to apply an overload to the motor during the ramp extracting step;
   a complete extraction determining step determining whether the main ramp is extracted completely by determining whether there is a limit signal;
   an extraction stopping step stopping the operation of the motor and stopping the alarming buzzer sound simultaneously, if it is determined that the main ramp is completely extracted;
   a motor stopping step stopping the motor to stop the extraction of the main ramp, if it is determined based on the result of the overload determining step that the motor is overloaded;
   an overload settlement determining step continuously re-comparing the input current and the limit current, and determining whether the input current returns below the limit current, if the motor stopping step is started; and
   a time pass determining step determining whether the time taken for the input current to return below the limit current is over a predetermined time if it is determined based on the result of the overload settlement determining step that the input current returns below the limit current, and continuing the ramp extracting step if it is determined that the time taken for the input current to return below the limit current is over the predetermined time.

2. A control method for a power ramp for a vehicle comprising:
- a restitution command determining step determining whether a restitution command is input by a button operating to restitute an extracted main ramp;
- a ramp restituting step operating a motor to restitute the main ramp into a vehicle and alarming buzzer sound simultaneously, if it is determined based on the result of the restituting command determining step that the restitution command is input;
- a stop signal determining step determining whether a stop signal is input during the ramp restituting step;
- an overload determining step determining whether an input current is over a predetermined limit current, to apply an overload to the motor during the ramp restituting step;
- a complete restitution determining step determining the main ramp is restituted into the vehicle completely by determining whether there is a limit signal;
- a restitution stopping step stopping the operation of the motor and stopping the buzzer sound simultaneously if the main ramp is restituted completely;
- a motor stopping step stopping the motor to stop the restitution of the main ramp if it is determined based on the result of the overload determining step that the motor is overloaded;
- an overload settlement determining step continuously re-comparing the input current with the limit current and determining whether an input current returns below a limit current by, if the motor stopping step is started;
- a time pass determining step determining whether the time taken for the input current to return below the limit current is over a predetermined time if it is determined based on the result of the overload settlement determining step that the input current returns below the limit current, and continuing the ramp restituting step if the time is over the predetermined time; and
- a usage counting step adding the number of use times if the restitution stopping step is started.

* * * * *